Patented Aug. 15, 1950

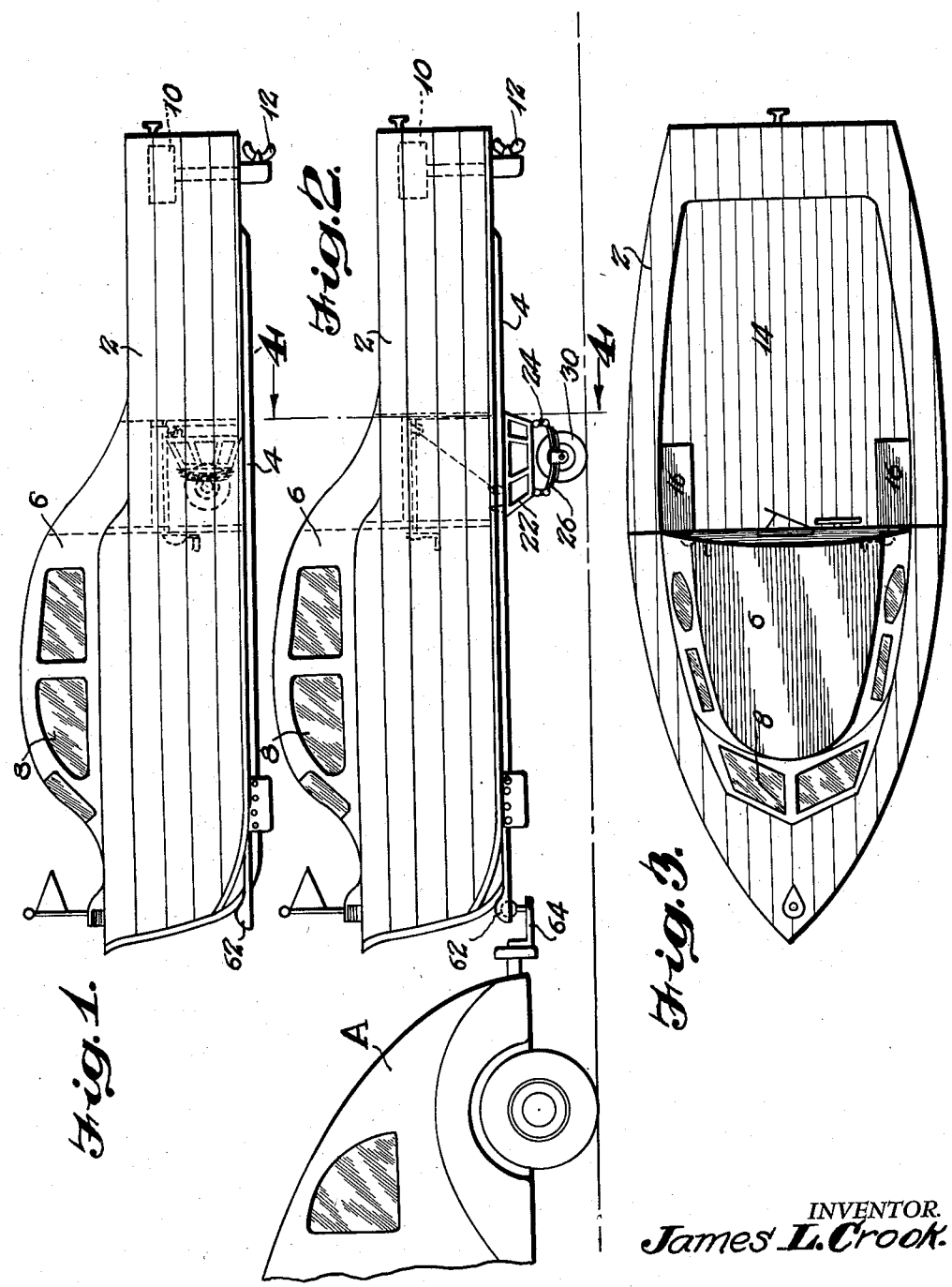

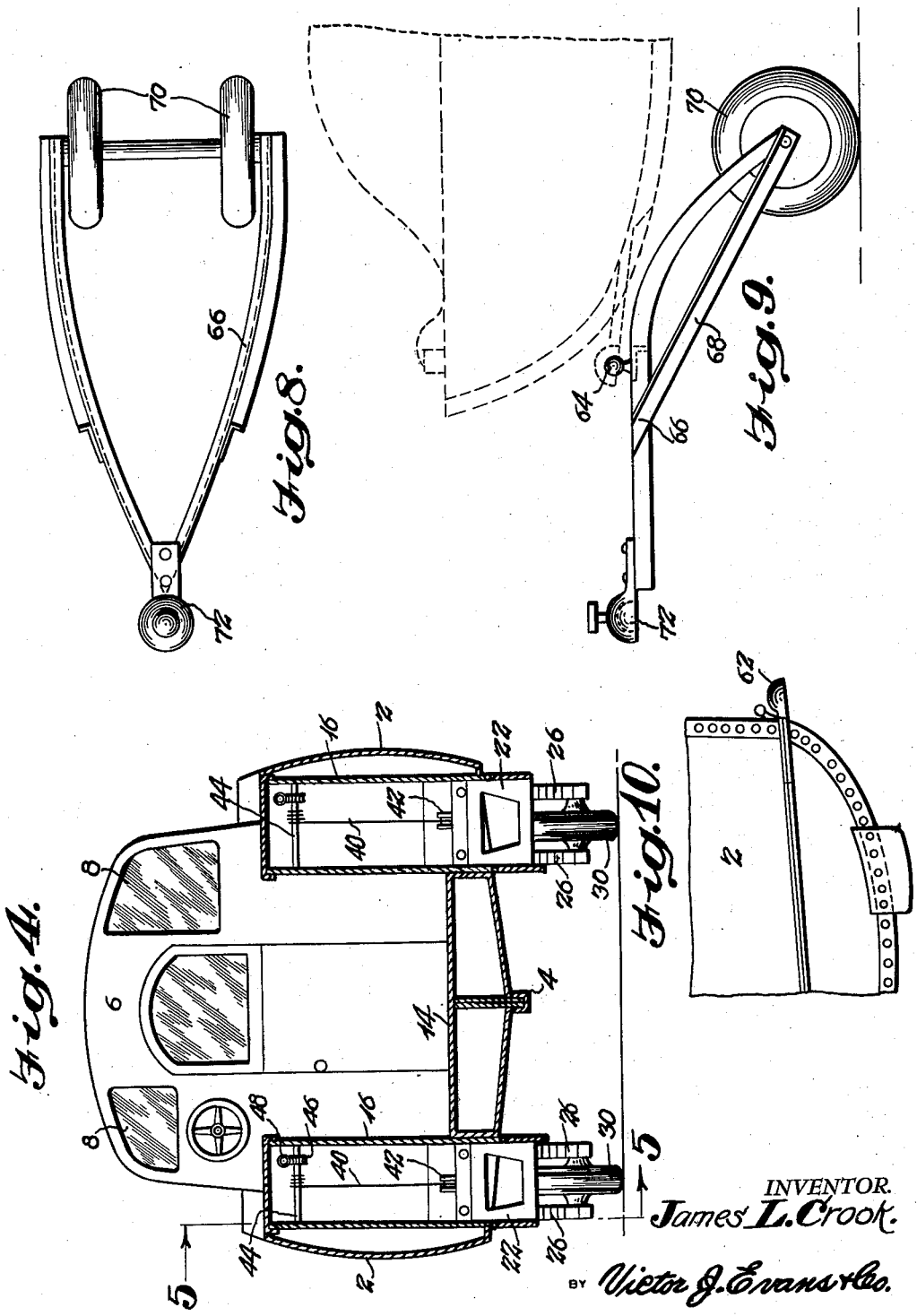

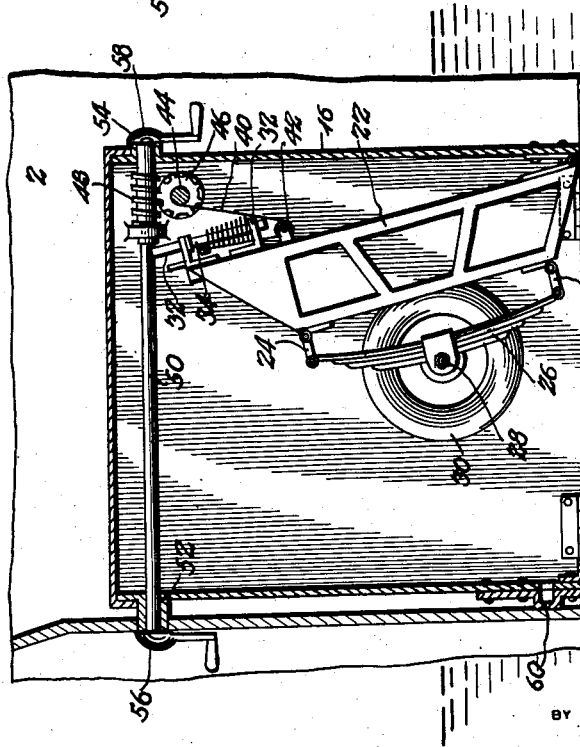

2,518,602

UNITED STATES PATENT OFFICE 2,518,602

COMBINED CABIN CRUISER, TRAILER, AND LIGHT FREIGHT TRAILER

James L. Crook, South Wales, N. Y., assignor of one-half to George R. Sedita, Buffalo, N. Y.

Application March 27, 1947, Serial No. 737,574

2 Claims. (Cl. 9—1)

My present invention relates to an improved combination cruiser and trailer and more particularly to a cabin cruiser powered by either inboard or outboard motor and provided with retractable wheels so that when not used as a water craft the vehicle may with the wheels lowered be attached to and drawn by a motor car to be used either as a living trailer or as a freight carrier.

In the accompanying drawings I have illustrated the complete example of the physical embodiment of my invention according to the best mode I have thus far devised, but it will be understood that various changes and alterations may be made in the exemplified structure within the scope of the appended claims.

In the drawings:

Fig. 1 is a side elevational view of the vehicle of my invention as used as a cruiser.

Fig. 2 is a side elevational view thereof as a trailer.

Fig. 3 is a top plan view of the vehicle.

Fig. 4 is a transverse vertical sectional view at line 4—4 of Fig. 2.

Fig. 5 is a longitudinal vertical sectional view at line 5—5 of Fig. 4 with the wheels retracted.

Fig. 6 is a similar view with the wheels in running position.

Fig. 7 is a longitudinal horizontal sectional view at line 7—7 of Fig. 6.

Fig. 8 is a top plan view of a draft carriage, and Fig. 9 is a side elevational view thereof.

Fig. 10 is a detail view of the bow of the vehicle showing the draft attachment.

Referring now to the drawings I have illustrated the present embodiment of my invention as comprising a boat of the cruiser type 2 having a keel 4 and cabin 6 with windows 8. Power may be supplied as by a motor 10 having propeller 12.

Substantially amidship and forward of the after deck 14 I provide a pair of opposed compartments 16 provided with lower hinged doors 18. Hingedly mounted at 20 interior of the compartments I employ the frames 22 formed with shackles 24 for the springs 26 to which are secured the axles 28 for wheels 30.

Each frame 22 has a pair of opposed lugs 32 securing plungers 34 pressed by springs 36 outwardly and lugs 38 on the plungers are connected at 39 and secure the end of a line 40 which passes under the sheave 42 to the winding shaft 44. A gear 46 on this shaft meshes with a worm gear 48 on the shaft 50 and this latter shaft journaled at 52 and 54 in the end walls of the compartment is rotated by cranks 56 or 58. When the boat is in condition for water travel as in Figure 1 the cranks are rotated to raise the frames 22 into the compartment 16 as in Figure 5. When the boat is in condition for land travel as in Figure 2 the cranks are rotated to lower the frames 22 out of the compartment 16 into the position shown in Figure 6.

The plunger 34 is engaged in a keeper 60 exterior of the end wall of the compartment and rotation of the shaft 50 will first retract the plunger from the keeper and then elevate the frame and wheel from the position of Fig. 6 to that of Fig. 5. The cranks on both ends of the shaft 50 permit operation of the described mechanism from within the cabin or the after deck.

When the wheels are positioned for land travel, it is desirable to pull the vehicle and I therefore provide a draft cup 62 under the bow for coaction with a standard trailer hitch 64 of an automobile A, or the cup may be placed over the ball 64 on the frame 66 of the carriage having braces 68 for wheels 70. A draft cup 72 on the carriage is designed for coaction with the conventional trailer hitch and may be used as circumstances warrant and appears desirable.

Having thus fully described my invention what I claim as new and desire to secure by Letters Patent is:

1. A boat formed with compartments amidships having lower doors, pivotally mounted frames in the compartments, road wheels on the frames, and crank operated means exterior of the compartments for elevating the frames and wheels, and for permitting gravity lowering of the frames and wheels, spring latch means for retaining said frames in lowered position and means for operating said latch means operated by said crank operated means.

2. An amphibious vehicle characterized by its rust-proofed sheet metal, prefabricated and riveted hull and formed with integral compartments amidships having lower doors, pivotally mounted frames in the compartments, road wheels on the frames, spring latch means securing said frames in position so that said road wheels are in operational engagement with the road, crank operated means exterior of the compartments for elevating the frames and wheels, and for permitting gravity lowering of the frames and wheels, and means connected to said spring latch means upon operation of said crank operated means.

JAMES L. CROOK.

REFERENCES CITED

The following references are of record in the file of this patent:

UNITED STATES PATENTS

| Number | Name | Date |
|---|---|---|
| 780,835 | Such | Jan. 24, 1905 |
| 1,760,644 | Hall | May 27, 1930 |
| 1,865,789 | Reel | July 5, 1932 |
| 1,874,570 | Minshall | Aug. 30, 1932 |
| 2,370,508 | Wilkie | Feb. 27, 1945 |